United States Patent [19]
LoNegro et al.

[11] Patent Number: 5,655,095
[45] Date of Patent: Aug. 5, 1997

[54] METHOD AND SYSETM FOR DESIGN AND DRAFTING

[75] Inventors: Rene LoNegro, Meudon, France; Stuart Wells, Watertown, Mass.

[73] Assignee: Adra Systems, Inc., Chelmsford, Mass.

[21] Appl. No.: 699,118

[22] Filed: Aug. 16, 1996

Related U.S. Application Data

[63] Continuation of Ser. No. 150,388, Nov. 9, 1993, Pat. No. 5,548,707.

[51] Int. Cl.$^6$ .................................................. G06F 15/00
[52] U.S. Cl. ............................................ 395/349; 395/964
[58] Field of Search ..................................... 395/964, 349

[56] References Cited

U.S. PATENT DOCUMENTS

| | | | |
|---|---|---|---|
| 5,123,087 | 6/1992 | Newell et al. | 395/348 |
| 5,371,845 | 12/1994 | Newell et al. | 395/347 |
| 5,548,707 | 8/1996 | LoNegro et al. | 395/763 |

OTHER PUBLICATIONS

Pro/Engineer Quick Reference, OnWord Press Development Team, May 1993, pp. 30–33.
TurboCad user Manual; International Microcomputer Software Inc., 1992, pp. 223–227, 320–352.

*Primary Examiner*—Mark R. Powell
*Assistant Examiner*—Ba Huynh
*Attorney, Agent, or Firm*—Testa, Hurwitz & Thibeault, LLP

[57] ABSTRACT

A dimension indicator is automatically created to define the size of a geometric object or the spatial relationship between two geometric objects for a user of a computer-aided design and drafting system by the data processing steps of displaying one or more geometric objects; determining the geometry of one or more of the displayed objects; choosing one of a plurality of possible dimension indicators for the object(s) based on the determination in the previous step; displaying an image of the chosen dimension indicator until a placement location is selected for the chosen dimension indicator; and then displaying the dimension indicator in the vicinity of the placement location.

8 Claims, 15 Drawing Sheets

BEFORE

AFTER

BEFORE

AFTER

AFTER

BEFORE

AFTER

BEFORE

AFTER

BEFORE

AFTER

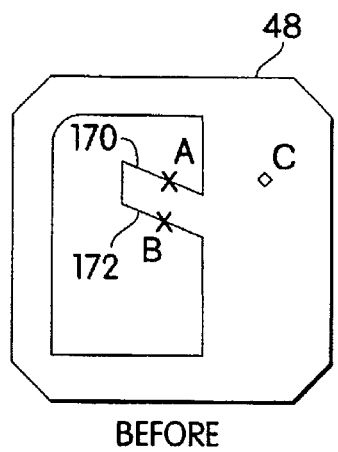
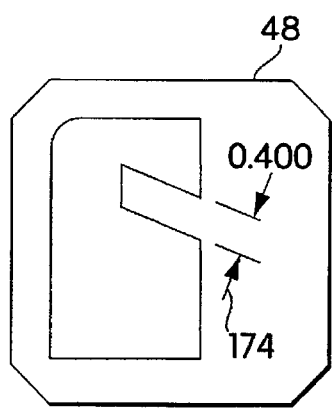
Fig. 11A  Fig. 11B
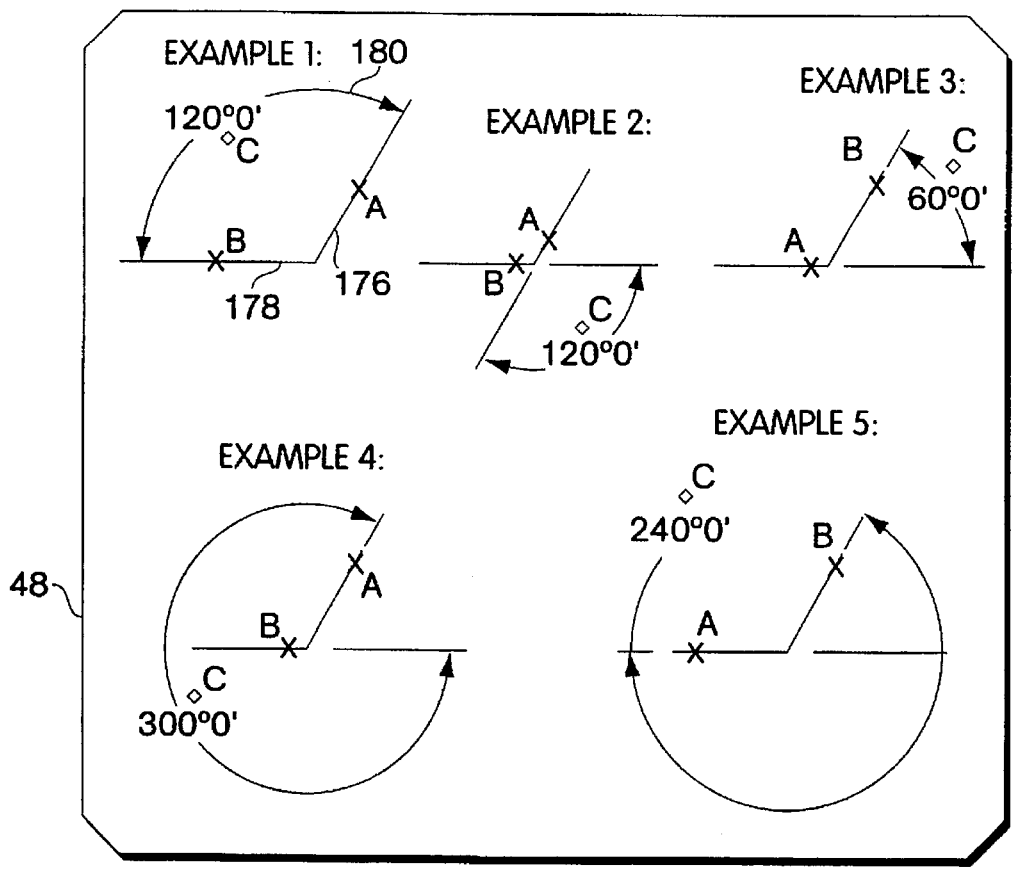
Fig. 12

METHOD AND SYSETM FOR DESIGN AND DRAFTING

This is a continuation of Ser. No. 08//150,388 filed Nov. 9, 1993 now U.S. Pat. No. 5,548,707.

BACKGROUND OF THE INVENTION

This invention relates to methods and systems for design and drafting, and more particularly, to such methods and systems which allow automatic creation of dimension indicators for geometric objects.

Computer-aided design and drafting systems typically allow a user to produce drawings and designs faster and with more mathematical precision than is possible by using pen and paper. Instead of pen and paper, users of such systems employ one or more computer input or pointing devices (e.g., keyboard, mouse, light pen, and/or digitizer tablet) to create and store a drawing.

Typical computer-aided design and drafting systems include the input device(s), a central processor, a data storage area or main memory, a fixed or hard disk drive unit, a floppy disk drive unit, a display device, an output device (e.g., a plotter or printer for creating a printout of the drawing), an input/output controller, and a bus which interconnects these components and allows communication therebetween. Programs loaded into the system allow the system to operate and define its capabilities as a computer-aided design and drafting system. The programs can be loaded, for example, by inserting a diskette containing the programs into the floppy drive or by automatic reading of the programs from the hard disk at system power-up.

With a computer-aided design and drafting system, a user can create geometric objects such as circles, arcs, lines, and points. A user also can create more complex objects which include one or more of the aforementioned objects as sub-elements. A variety of other geometric objects also can be created.

A user of a computer-aided design and drafting system often includes dimension indicators in a drawing to identify the dimensions of one or more geometric objects in the drawing. Dimension indicators are markings on the drawing which are associated with the objects to indicate, for example, diameter, radius, length, length of a curved surface, linear separation distance, and angular separation distance. Typical dimension indicators include double-tipped and single-tipped arrows. In most instances, a number (or a number and an alphanumeric symbol) is displayed along with the dimension indicator, the number providing a precise dimensional measurement of the dimensioned object.

In a typical computer-aided-design and drafting system, a user must manually perform several steps to select the desired type of dimension indicator and the object to be associated therewith. For example, if a user desires to place a diameter indicator near a circle to identify the diameter of the circle, a user must enter a first command to the system to indicate a desire to enter a dimensioning mode; enter a second command to the system to indicate a desire to display a diameter indicator; enter a third command to select the circle; and then enter a fourth command to indicate where the diameter indicator should be placed with respect to the selected circle.

SUMMARY OF THE INVENTION

The invention relates to systems and methods for automatically creating a dimension indicator which defines the size of a geometric object or the spatial relationship between two geometric objects. Such systems and methods allow a user of a computer-aided design and drafting system to eliminate some of the numerous manual steps typically required of the user.

Use of the systems and methods according to the invention can result in significant time savings and reductions in the amount of effort required to complete a drawing. These inventive systems and methods make the computer-aided design and drafting system very easy to use (i.e., very user friendly), and thus much more likely to be utilized by all types of people, including those who are intimidated by computers and other complex electronic equipment. In general, the invention can significantly increase the productivity of any user of the computer-aided design and drafting system.

In one aspect, the invention features a method for automatically creating a dimension indicator to define the size of a geometric object for a user of a computer-aided design and drafting system. The method comprises providing programming means for controlling the system to: display at least one geometric object; determine the geometry of the displayed object; choose one of a plurality of possible dimension indicators for the object based on the determination in the previous step; display an image of the chosen dimension indicator until a placement location is selected for the chosen dimension indicator; and display the dimension indicator in the vicinity of the placement location.

In another aspect, the invention relates to a method for automatically creating a dimension indicator to define the spatial relationship between two geometric objects for a user of a computer-aided design and drafting system. This method comprises similar data processing steps as those described above except that in this method at least two geometric objects are displayed, and the geometry of a first one of the displayed objects and a second one of the displayed objects is determined. One of a plurality of possible dimension indicators is then chosen for the first and second objects based on the two geometry determinations.

In yet another aspect, the invention features a computer-aided design and drafting system. The system comprises a computer having at least a memory and a processor. Also included in the system is a cursor controlling device coupled to the computer for generating signals indicative of desired movement on the display device; a display device coupled to the computer; and programming means for controlling or operating the computer. The programming means comprises means for displaying at least one geometric object on the display device; means for determining the geometry of the displayed object; means for choosing, based on the determination made by the geometry determining means, a dimension indicator for the object from a plurality of possible dimension indicators stored in the memory; means for displaying an image of the chose dimension indicator on the display device, in response to the signals generated by the cursor controlling device, until a placement location is selected for the chosen dimension indicator on the display device; and means for displaying the dimension indicator on the display device in the vicinity of the placement location.

In still another aspect, the invention involves a computer-aided design and drafting system similar to the system described above except that the programming means comprises means for displaying at least two geometric objects on the display device; means for determining the geometry of a first one of the displayed objects and a second one of the displayed objects; means for choosing, based on the determinations made by the two geometry determining means, a dimension indicator for the first and second objects from a plurality of possible dimension indicators stored in the memory; means for displaying an image of the chosen dimension indicator on the display device, in response to the signals generated by the cursor controlling device, until a placement location is selected for the chosen dimension indicator on the display device; and means for displaying the dimension indicator on the display device in the vicinity of the placement location.

Other objects, aspects, features, and advantages of the invention will become apparent from the following description and from the claims.

BRIEF DESCRIPTION OF THE DRAWINGS

FIGS. 6–12 illustrate the "quick dimensioning" of various geometric objects, in accordance with the invention, specifically:

FIG. 7 illustrates the quick dimensioning of an arc;

FIGS. 11A and 11B illustrate the quick dimensioning of two parallel lines; and

FIG. 12 illustrates the quick dimensioning of two skew lines.

DESCRIPTION

The invention allows a user of a computer-aided design and drafting system to automatically create a dimension indicator for one or more geometric objects.

Figure 1:
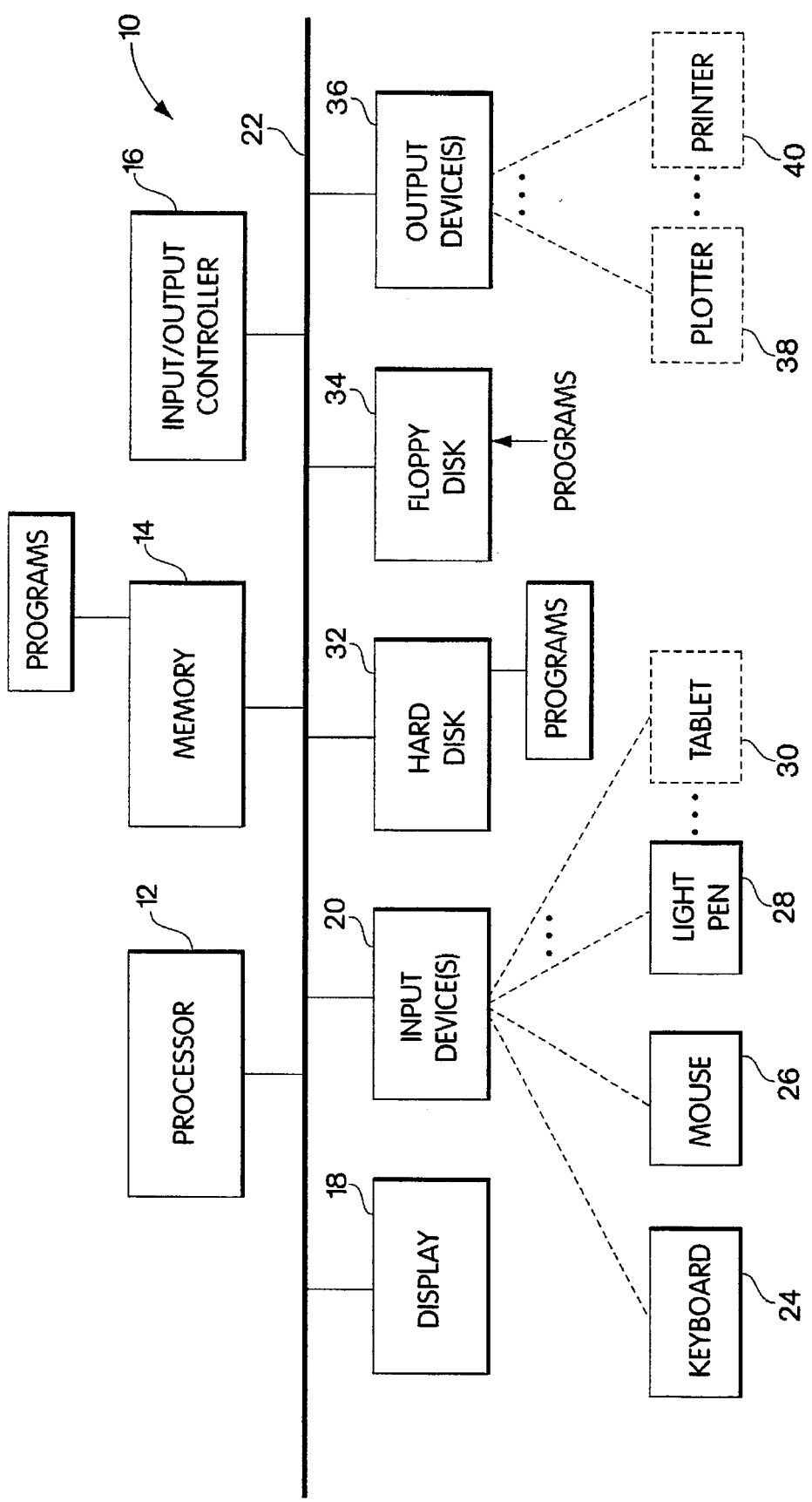
FIG. 1 is a simplified functional block diagram of a computer system in which the present invention can be embodied.

Referring to FIG. 1, the computer-aided design and drafting system 10 includes a central processor 12, a main memory unit 14 for storing programs and/or data, an input/ output controller 16, a display device 18, an input device 20, and a data bus 22 coupling these components to allow communication therebetween. The input device can include a keyboard 24, a mouse 26, a light pen 28, and/or a digitizer tablet 30. If the tablet 30 is provided, a stylus or a puck generally is also provided for use therewith. Typically, only the keyboard 24 and the mouse 26 are provided with the system 10, and a user employs one or both to create, store, and retrieve drawings and designs. The input devices 20, regardless of their type, provide the user with a means to control (e.g., move, select, and indicate) cursors, dimension indicators, objects, and other items on the display screen 18. In general, the input devices 20 generate signals indicative or representative of movement, placement, or other action desired by the user, i.e., when the user manipulates the input device(s), signals are generated which are acted on by the system 10 (e.g., the processor 12) and result in the desired movement or other action. The system 10 typically also includes a fixed or hard disk drive unit 32, a floppy disk drive unit 34, and an output device 36 such as a plotter 38 or a printer 40.

In the disclosed embodiment, computer programs define the operational capabilities of the computer-aided design and drafting system 10. The programs can be loaded into the system 10 via the floppy drive 34, or they can be resident on the hard drive 32 and automatically loaded therefrom upon power-up of the system 10. Alternatively, the programs can reside in a permanent memory portion (e.g., a ROM chip) of the main memory 14.

The computer-aided design and drafting system 10 can be an appropriately programmed personal computer (PC) or workstation, including a PC sold by IBM, a clone of an IBM PC, a Sparc or other model sold by Sun, a Silicon Graphics computer, a Hewlett Packard computer, a Mips or other DEC computer, or an Apple Macintosh. In general, the particular type of computer or workstation is not central to the invention. In other embodiments, the design and drafting system can be implemented totally in hardware, i.e., dedicated electronic circuits can be designed to perform all functions which the appropriately programmed computer can perform.

In the disclosed embodiment, the user constructs objects and drawings on the display device 18 with the mouse 26. Each object and drawing has precise mathematical representations which are stored in the system 10 (e.g., in the main memory 14). A typical drawing created by a user of the system 10 includes a plurality of geometric shapes or objects. The objects can be relatively simple geometric elements such as lines, circles, points, arcs, and splines. The objects also can be more geometrically complex configurations consisting of one or more of the simple elements (e.g., a square or a trapezoid which consists of four lines). In addition to allowing a user to build complex objects from simpler sub-elements, the system 10 can store a variety of complex objects (e.g., squares, triangle, rectangles, and ellipses) which the user can recall as a single object.

Figure 2:
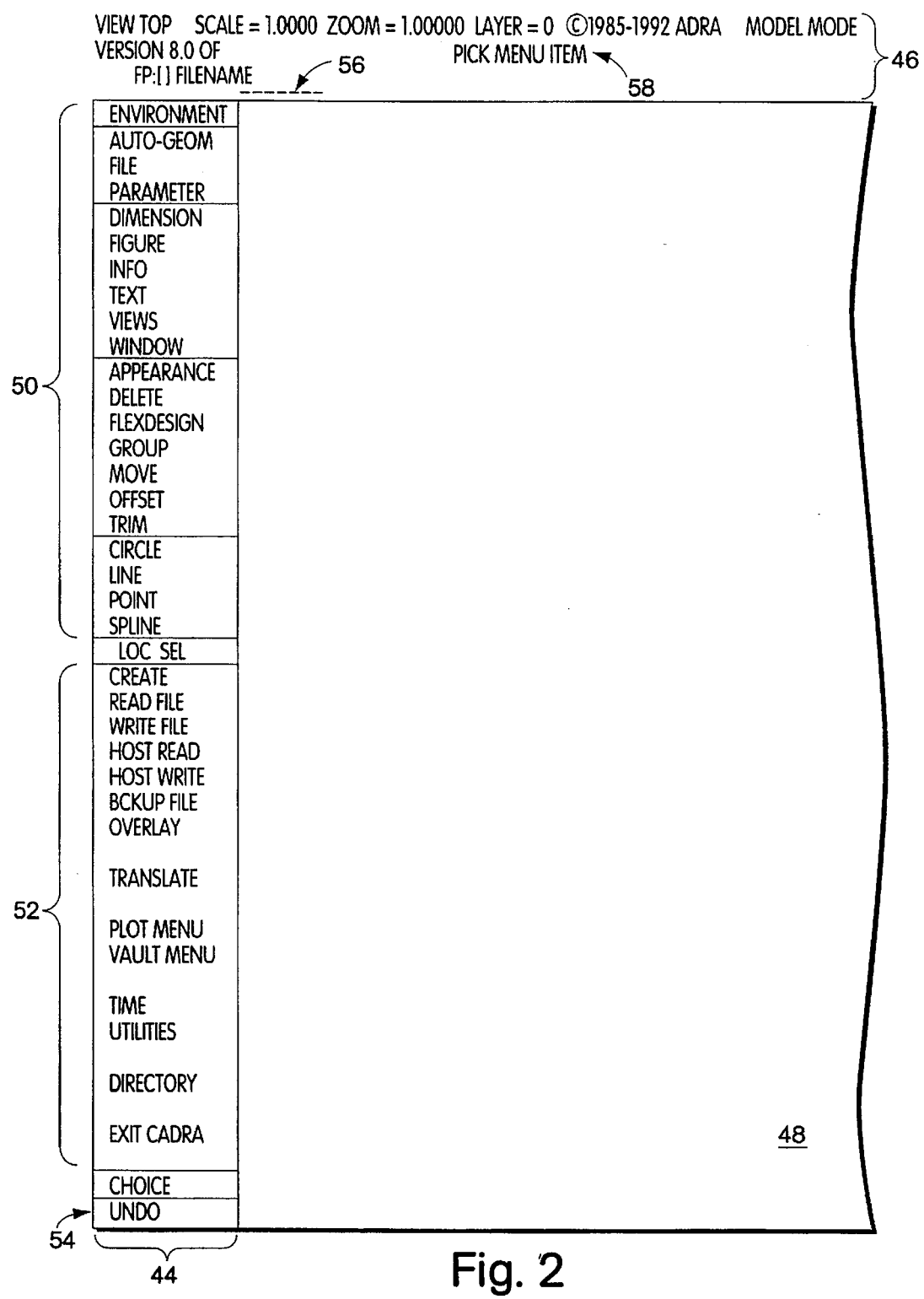
FIG. 2 is a screen of a computer-aided design and drafting system according to the invention.

Referring to FIG. 2, a user of the system 10 is provided with a variety of information on a screen of the display device 18. In the disclosed embodiment, the screen is divided into three sections: a menu 44 in the left margin, a feedback area 46 across the top, and a drawing window 48. The feedback area 46 includes a "key-in" area 56 where a user can type text, numbers, or special characters from the keyboard 24. The feedback area 46 also includes a prompt area 58 where the system 10 displays messages to the user. The drawing window 48 is where the user creates drawings and where all drawings and objects are displayed. The menu 44 shows some options available to the user such as functions 50, function options 52, and an "undo" button 54 for reversing the last action taken by the user. In general, when the user makes a selection from the menu 44 (e.g., by manipulating the mouse 26 to position the cursor over a desired function and then clicking a button on the mouse to confirm the selection of that function), the options change. The system 10 has an extensive menu structure which is not apparent from the relatively few options available from the "main" menu 44 shown in FIG. 2. The menu structure is described below with respect to FIGS. 3A and 4.

Figure 3A:
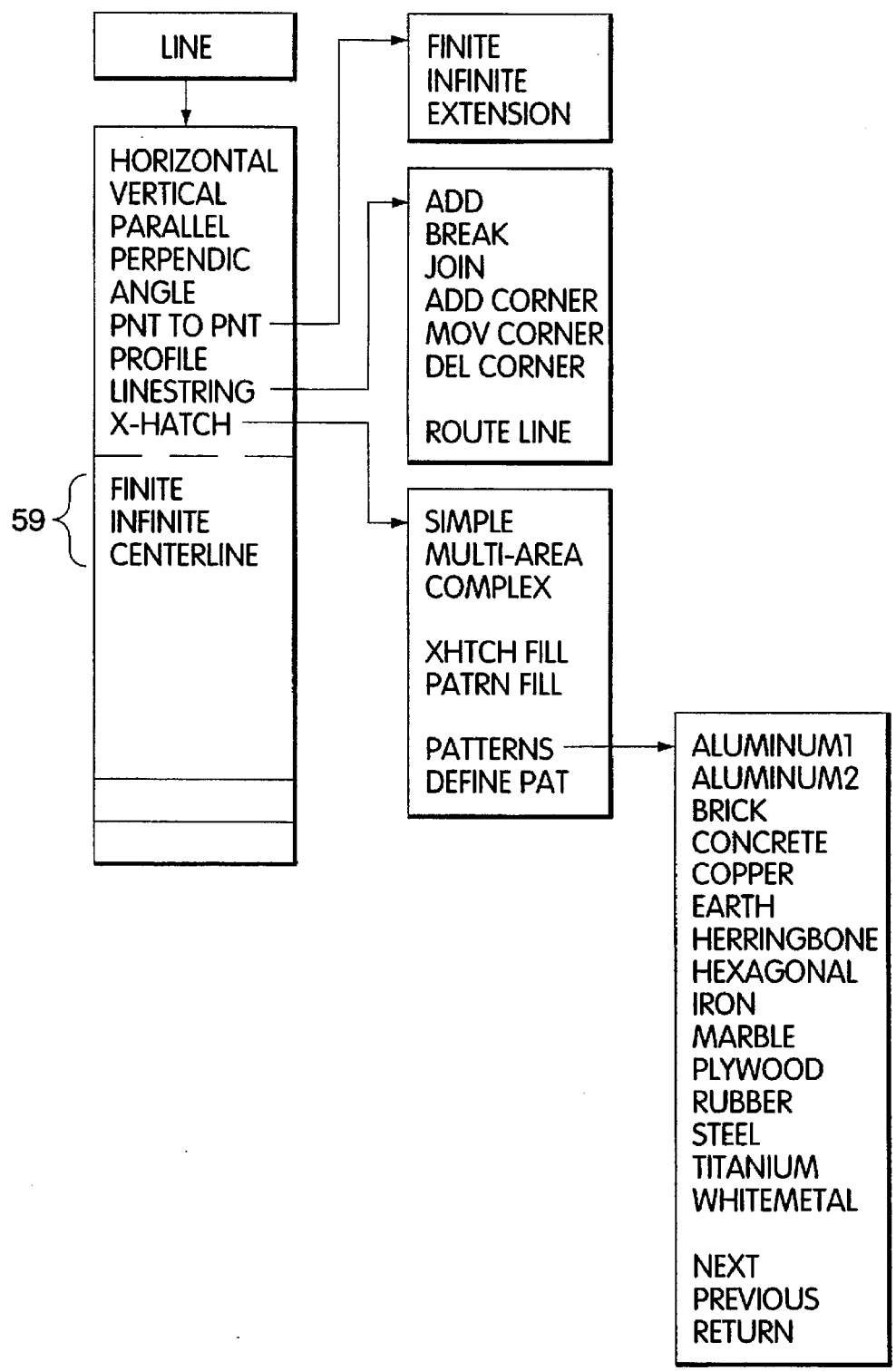
FIGS. 3A, 3B, and 3C are menus and screens associated with the creation of a line by the computer-aided design and drafting system.

To create a line in the drawing window 48, the user selects the "Line" function from the functions 50 on the menu 44. Once Line is selected, other options become available in the menu 44. Referring to FIG. 3A, in the disclosed embodiment, those other options include Horizontal, Vertical, Parallel, Perpendic, Angle, Pnt to pnt, Profile, Linestring, and X-Hatch. (Note that Finite, Infinite, and Centerline, which are indicated by a bracket 59, are additional options displayed when the user selects Horizontal, Vertical, Parallel, Perpendic, Angle, or Profile.) To create a horizontal line of finite duration, the user selects "Horizontal" which causes the options Finite, Infinite, and Centerline also to become available in the menu 44. The user then selects "Finite." At this point, the user can enter a starting point for the line by (i) typing in X and Y coordinate values in the key-in area 56 or (ii) moving the cursor to the desired point and clicking the mouse. The user then enters the length of the line and the system 10 displays the horizontal line of finite duration in the drawing window 48 at the specified location. The length of the line can be entered by (i) typing in the length in the key-in area 56 and then indicating direction by moving the cursor to the right or the left of the starting point and clicking the mouse or (ii) moving the cursor a horizontal distance from the starting point which equals the desired length and then clicking the mouse.

Figure 3B:
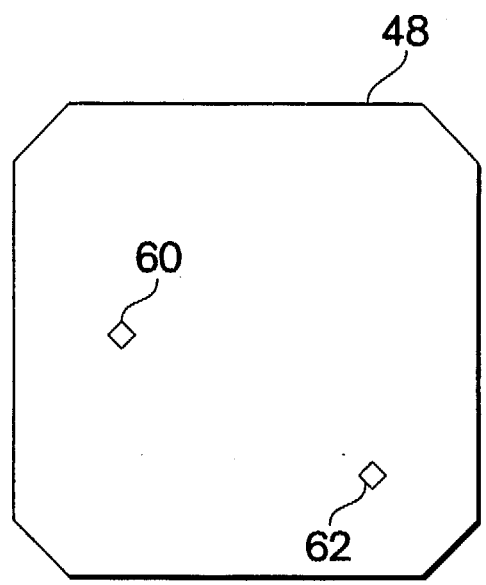
Figure 3C:
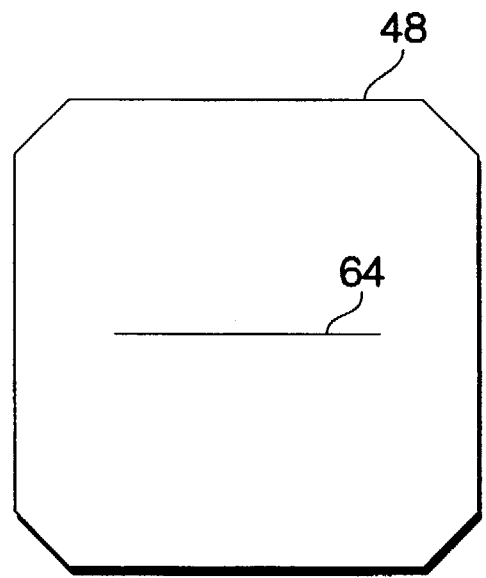

Referring to FIG. 3B, regardless of the steps the user takes to locate the starting point and to identify the length of the horizontal line, the system 10 provides feedback to the user in the drawing window 48 during the creation of the line by displaying a first point 60 (the starting point) and then a second point 62 (the direction and/or length). Referring to FIG. 3C, the horizontal line 64 is displayed after the system 10 has been given the necessary starting point and length information by the user.

The user can create a more complete drawing by creating more lines and other objects in a manner similar to that described above. In addition to objects, the user can place dimension indicators in the drawing. A dimension indicator typically is associated with an object by placing it near the object. Various types of dimension indicators can be used including diameter indicators, radius indicators, length indicators, linear separation distance indicators, and angular separation indicators, as well as a variety of other types.

Figure 4:
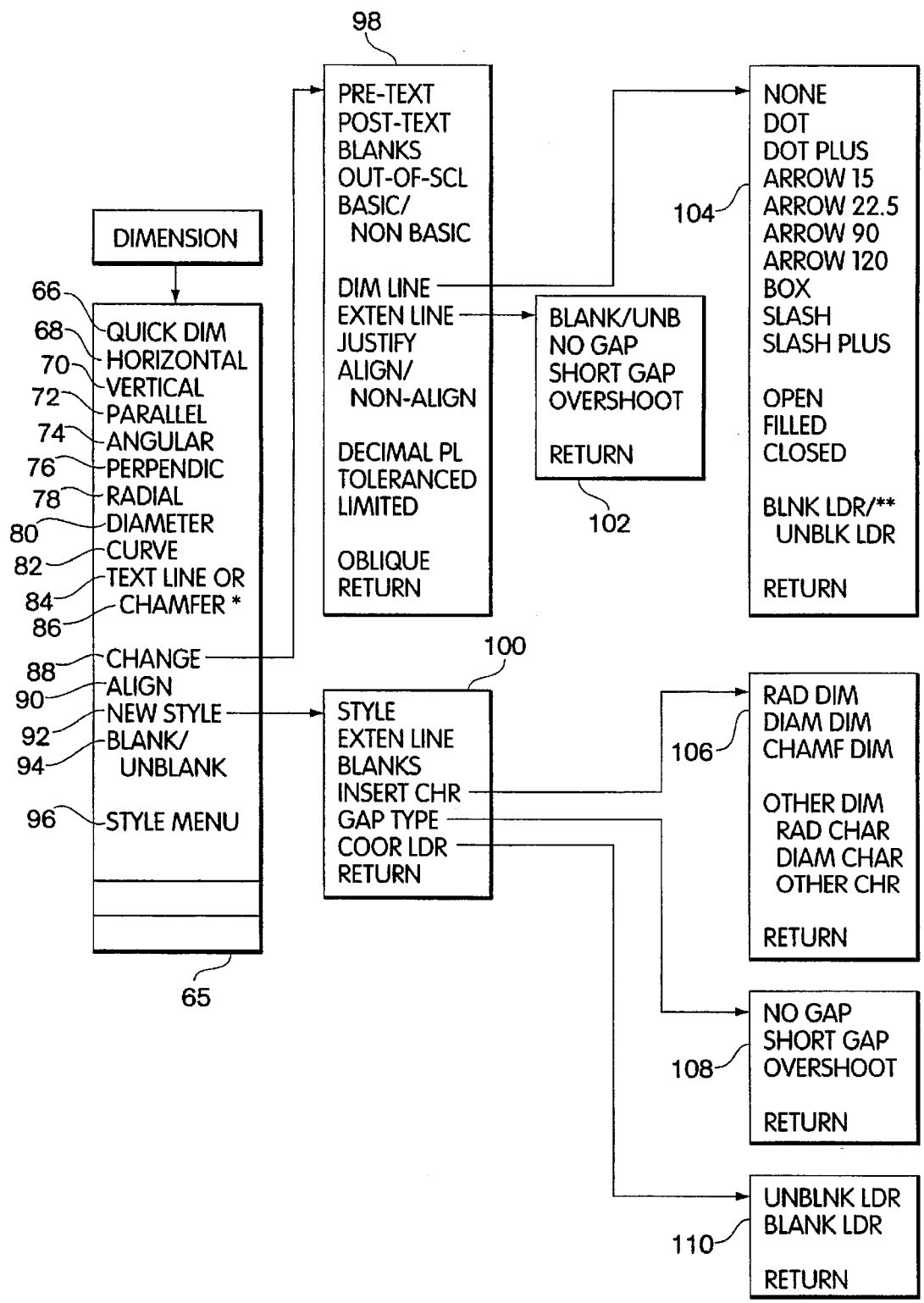
FIG. 4 is a menu structure associated with the creation of a dimension indicator by the computer-aided design and drafting system.

In the disclosed embodiment, to place a dimension indicator next to an object in the drawing (i.e., to create an indicator for an object or objects), the user of the computer-aided design and drafting system 10 selects "Dimension" from the menu 44. After making this selection, the menu options change as indicated in FIG. 4. Specifically, the user is then provided with dimension options 65 which include Quick Dim 66, Horizontal 68, Vertical 70, Parallel 72, Angular 74, Perpendic 76, Radial 78, Diameter 80, Curve 82, Text line 84 (or Chamfer 86), Change 88, Align 90, New Style 92, Blank/Unblank 94, and Style menu 96. (Note that Text line 84 is displayed if the dimension style, which the user can set by using the Style menu 96 option, is set as ANSI. If the dimension style is other than ANSI, however, Chamfer 86 is the option displayed.) Note that in a preferred embodiment, Quick Dim 66 is "pre-highlighted" upon selection of Dimension from the menu 44 meaning that the user need only perform an abbreviated selection process to select Quick Dim 66. By selecting Quick Dim 66, the user invokes a time-saving, effort-reducing, productivity-increasing feature according to the invention which allows automatic dimensioning of objects in the drawing window 48.

Sub-menus which only appear when certain dimension options are selected include a "change" sub-menu 98 and a "new style" sub-menu 100. The selection of certain options from either the change sub-menu 98 or the new style sub-menu 100 results in still other sub-menus 102, 104, 106, 108, and 110 being shown to the user. (Note in sub-menu 104 that a Blnk ldr/Unblk ldr toggle appears only if the user selected to change a radial dimension having a leader inside the circle.)

The user selects the Quick Dim option 66 to create automatically a dimension indicator type for an object. In general, to create the indicator, the user (once the Quick Dim option 66 has been selected from the dimension options 65) simply selects an object and then indicates a location in the drawing window 48 for placement of a dimension indicator. After the object is selected, the system 10 determines the appropriate type of dimension indicator for that object and displays a movable "image" of the appropriate indicator. The user typically indicates a placement location for the indicator by manipulating the mouse 26 to move the image of the appropriate indicator to the desired spot in the drawing window 48 and then clicking a button on the mouse 26 to confirm the spot as the placement location for the indicator. The image can be a ghost or shadow (e.g., displayed in lower intensity than most other items on the display screen and/or in a blinking mode) of the appropriate dimension indicator which the user can identify easily by its visual distinctiveness. The image moves in response to the users' mouse manipulations until the placement location is confirmed by the user. Once confirmed, the appropriate indicator is shown in "normal" mode; that is, the image is replaced by the actual indicator (e.g., the indicator is displayed in the same intensity as most other items on the display screen and/or in a non-blinking mode).

Figure 5:
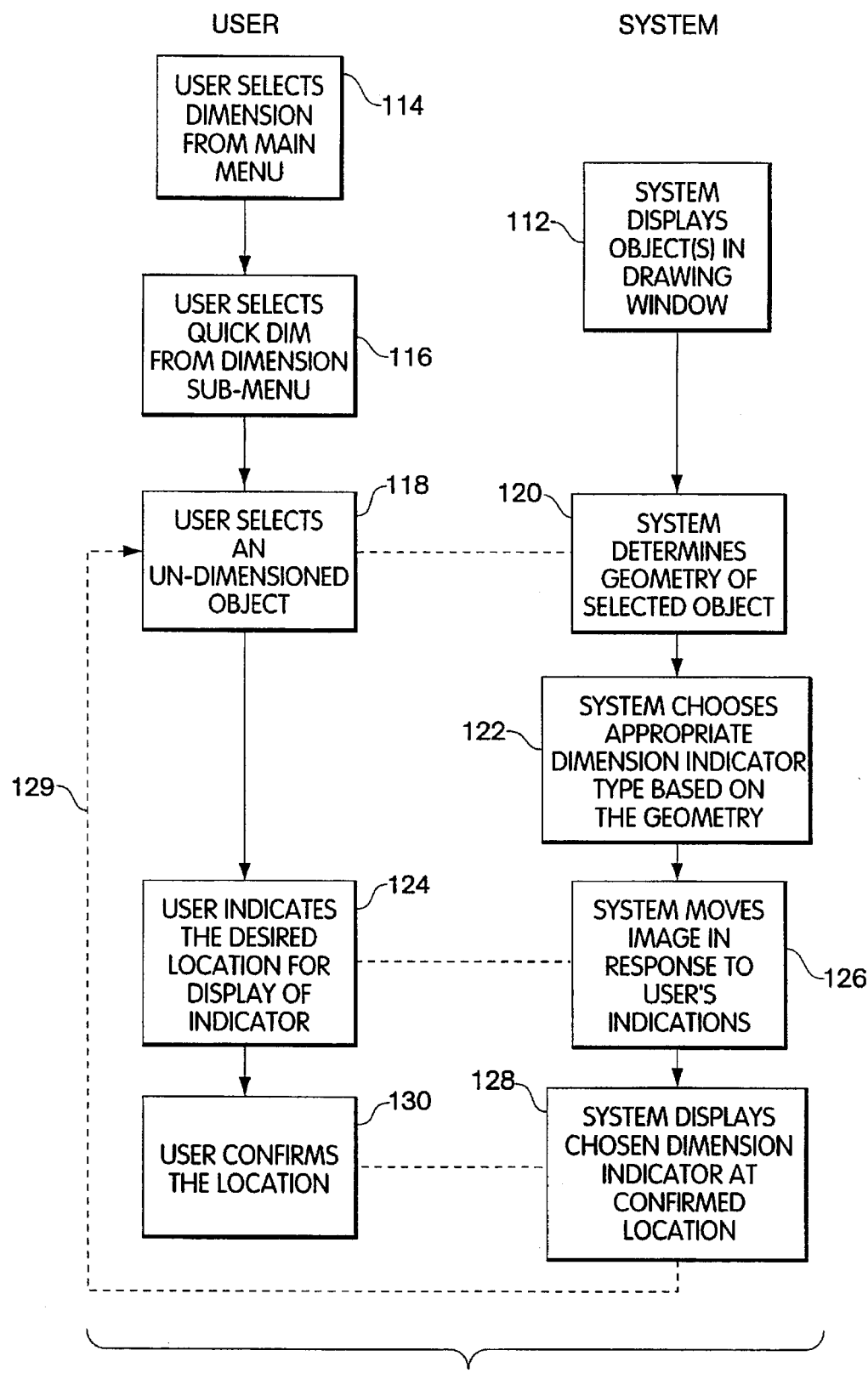
FIG. 5 is a flowchart of actions of a user of the computer-aided design and drafting system and associated functions performed by the system.

Referring to FIG. 5, with one or more objects displayed in the drawing window 48 (step 112), the user selects the dimension function from the main menu 44 and then the "pre-highlighted" Quick Dim option 66 from the dimension sub-menu 65 (steps 114 and 116). The user then selects an un-dimensioned object (step 118) which causes the system 10 to examine the geometry of the selected object and choose the appropriate type of dimension indicator based on the geometry (steps 120 and 122). For example, in the disclosed embodiment, if the selected object is a circle, the dimension indicator type chosen is a diameter indicator. After the user selects the object (step 118), the user uses the mouse 26 (or other input device 20) to indicate a desired location for displaying the dimension indicator (step 124). In response, the system 10 displays a moving image of the indicator (step 126), and then displays the actual chosen dimension indicator at a desired location (step 128) after the user clicks the mouse (step 130) or otherwise indicates through another input device 20 that the desired location is correct. As indicated by a feedback arrow 129 the process of FIG. 5 loops back to step 118 after a dimension indicator has been created according to the invention.

With the quick dimension feature invoked, if the user selects (e.g., clicks the mouse 26 on) a dimension indicator displayed in the drawing window 48, or if the user selects an object that already has a dimension indicator related thereto, before the user has selected any un-dimensioned geometric objects, the system 10 automatically activates the change function 88 of the dimension options 65 (FIG. 4). The user is then provided with the change sub-menu 98 which allows the user to change the selected dimension indicator in a variety of ways. The user can continue to select and change dimension indicators in this manner. Once the user selects an un-dimensioned object, however, dimension indicators can no longer be selected and changed by the change sub-menu 98.

In the disclosed embodiment, certain geometries have particular dimension indicator types "linked" to them such that whenever that geometric object is selected for quick dimensioning by the user, the system 10 chooses the linked dimension indicator type. Table 1 shows the "links" for a variety of types of geometric objects. Each entry in Table 1 is described in more detail below.

TABLE 1

List of Objects and
Corresponding Dimension Types and Text Locations

| Object Selected | Dimension Indicator Type (and Orientation) | Possible Locations for Text Associated with Indicator |
| --- | --- | --- |
| Circle | Diameter | Anywhere |
| Arc | Radius | Anywhere |
| Spline | Curved Surface Length | Anywhere |
| Veritcal Line | Length (Vertical) | Anywhere |
| Horizontal Line | Length (Horizontal) | Anywhere |
| Skewed Line | Length (Vertical) | Outside X-extent AND Inside Y-extent |
| Skewed Line | Length (Horizontal) | Inside X-extent AND Outside Y-extent |
| Skewed Line | Length (Parallel) | Inside X & Y extents OR Outside X & Y extents |
| Two Parallel Lines | Linear Separation (Perpendicular) | Anywhere |
| Two Skew Lines | Angular Separation | Anywhere |
| Two Points | Same as for Skewed Line | Same as for Skewed Line |

Figure 6A:
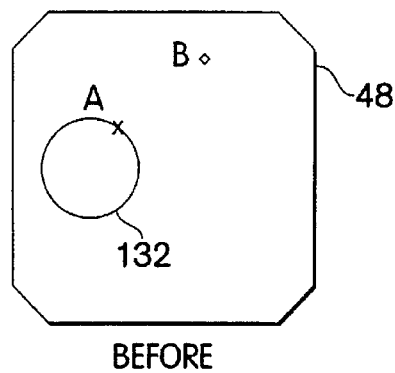
FIGS. 6A and 6B illustrate the quick dimensioning of a circle.
Figure 6B:
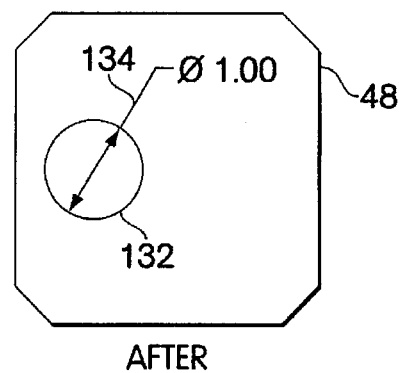

Referring to FIGS. 6A and 6B, if the user selects a circle 132 as the object to be quick dimensioned, the system 10 automatically chooses a diameter indicator 134. After the user indicates a placement location, the system 10 displays the indicator 134 in the vicinity of that location as shown in FIG. 6B. In FIG. 6A, selection of the circle 132 is identified by a point A, and indication of the placement location is identified by a point B. As shown in Table 1, point B could be placed anywhere in the drawing window 48, and therefore the text portion of the diameter indicator could be placed anywhere in the window 48.

In general, a dimension indicator has two parts, a graphical portion and a text or alphanumeric portion. In FIG. 6B, the graphical portion is a line with arrowheads at either end, and the text portion includes a diameter symbol (φ) followed by the numerical value of the diameter (in whatever units the user previously specified to the system 10).

Figure 7:
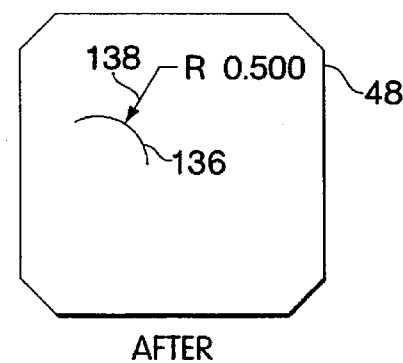

Referring to FIG. 7, selection of an arc 136 for quick dimensioning is similar to selecting a circle. When the user selects the arc 136 and indicates a placement location, the system 10 chooses a radius indicator 138 and displays it in the vicinity of the placement location. The graphical portion of the radius indicator 138 is a line with arrowheads, and the text portion includes a radius symbol (R) followed by the numerical value of the radius. The system 10 determines the radius of the arc 136 by first determining where the center point would be if the arc was part of a complete circle.

Figure 8A:
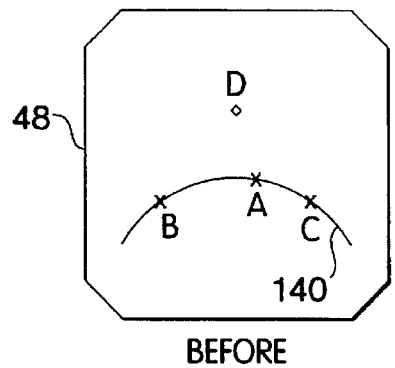
FIGS. 8A and 8B illustrate the quick dimensioning of a spline.
Figure 8B:
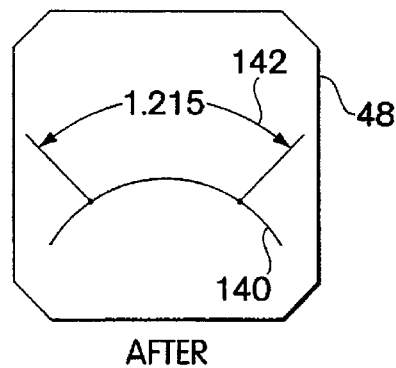
Figure 9A:
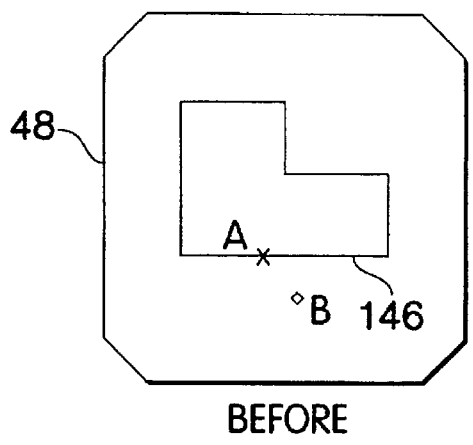
FIGS. 9A, 9B, 9C, and 9D illustrate the quick dimensioning of vertical and horizontal lines.
Figure 9B:
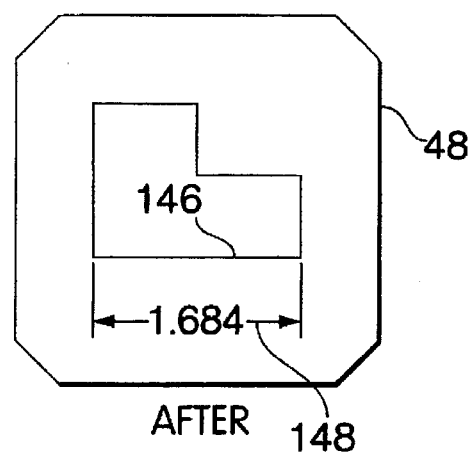
Figure 9C:
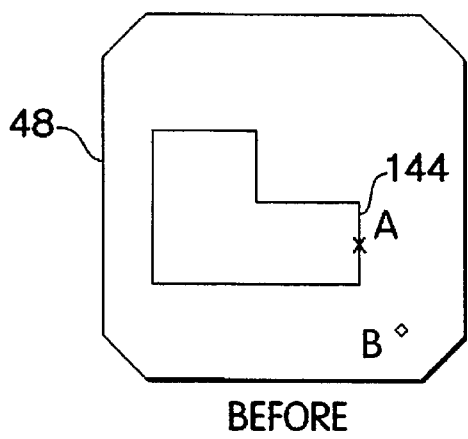
Figure 9D:
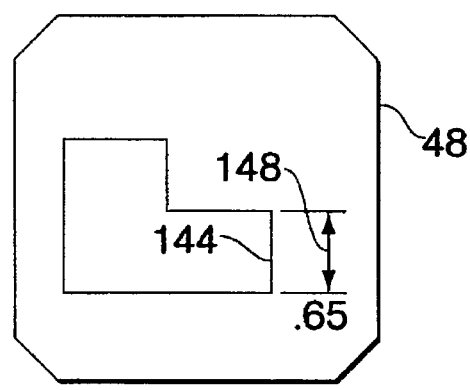

Referring to FIGS. 8A and 8B, when a spline 140 is selected by the user for quick dimensioning, the system 10 automatically chooses a length indicator 142, specifically, a curved surface length indicator. The user selects the spline by clicking on it with the mouse 26 (point A). The spline has two endpoints (points B and C). The user then indicates the placement location where the dimension indicator 142 should be placed (point D). The graphical portion of the length indicator 142 includes a double-arrowheaded line extending between two endlines, and the text portion includes the numerical value of the length of the spline's curved surface.

Referring to FIGS. 9A–9D, if the user selects a vertical 144 (FIGS. 9C and 9D) or horizontal 146 (FIGS. 9A and 9B) line to be quick dimensioned, the system 10 automatically chooses a length indicator 148. After the user selects the line 144 or 146 (point A in FIGS. 9A and 9C) and then indicates a placement location (point B), the system 10 displays the indicator 148 in the vicinity of the placement location. For the horizontal line 146, the indicator 148 is positioned or oriented horizontally (i.e., parallel to the horizontal line 146). For the vertical line 144, the length indicator 148 is oriented vertically (i.e., parallel to the vertical line 144). In both cases, the graphical portion of the length indicator 148 includes a double-arrowheaded line extending between two endlines, and the text portion includes the numerical value of the linear length of the line.

Figure 10A:
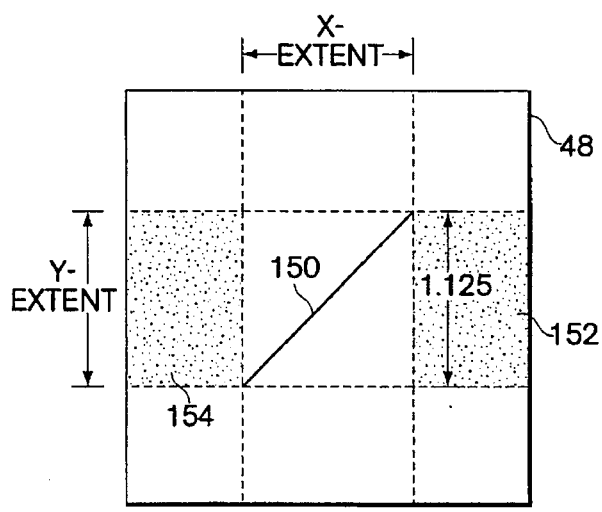
FIGS. 10A, 10B, 10C, 10D, and 10E illustrate the quick/ dimensioning of skewed lines.
Figure 10E:
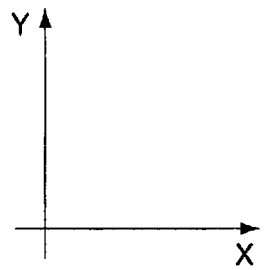
Figure 10B:
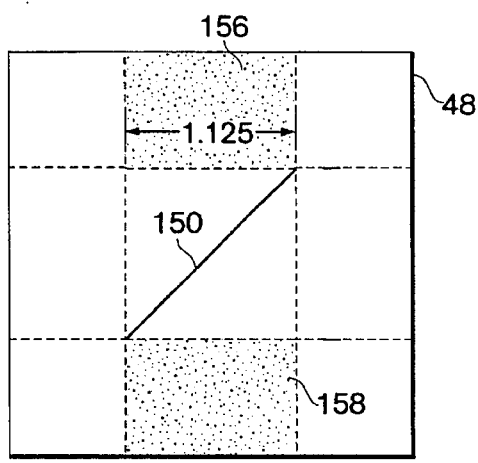
Figure 10C:
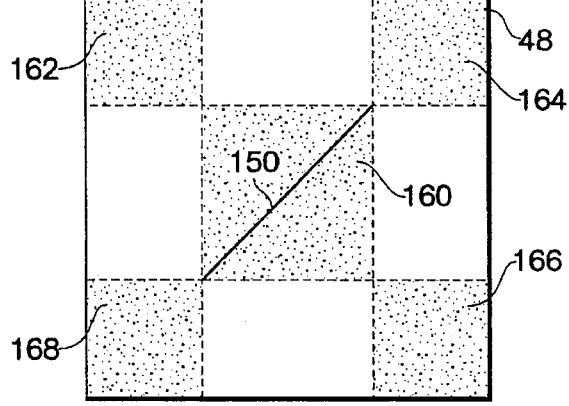
Figure 10D:
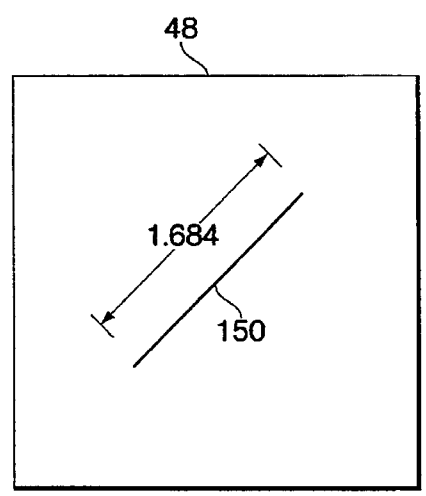
Figure 13A:
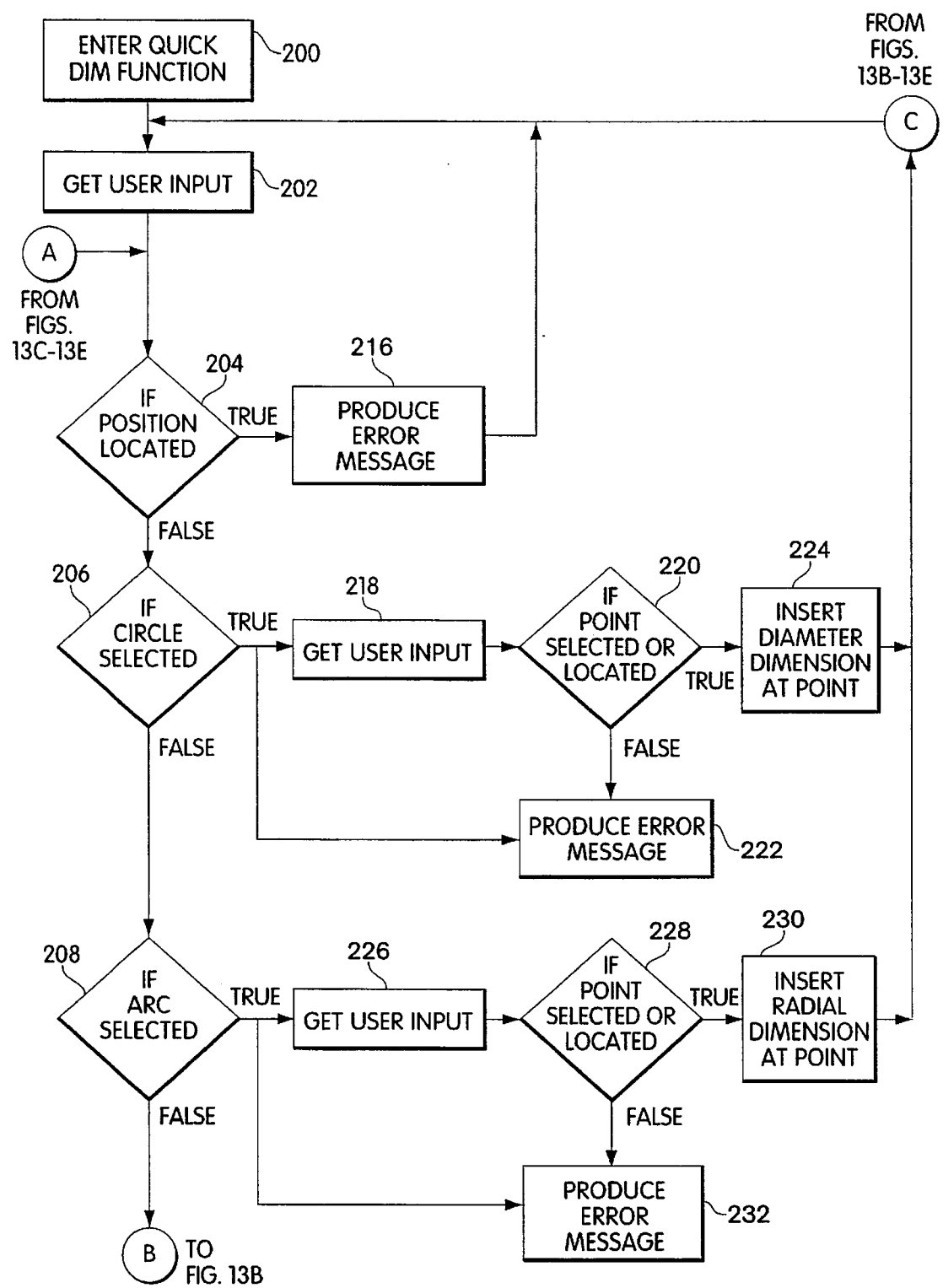
FIGS. 13A–13E are flowcharts detailing the quick dimensioning feature according to the invention.
Figure 13B:
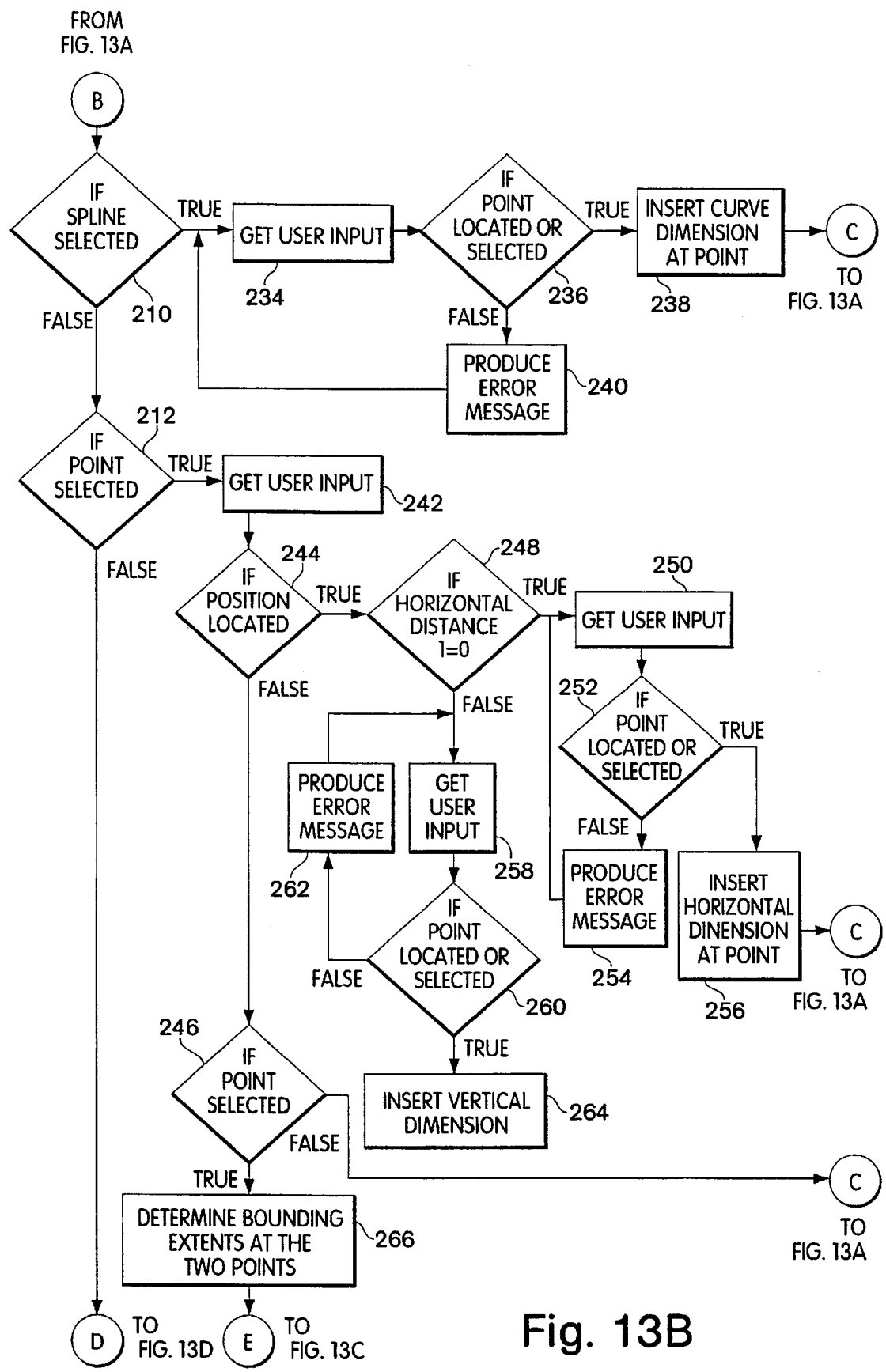
Figure 13C:
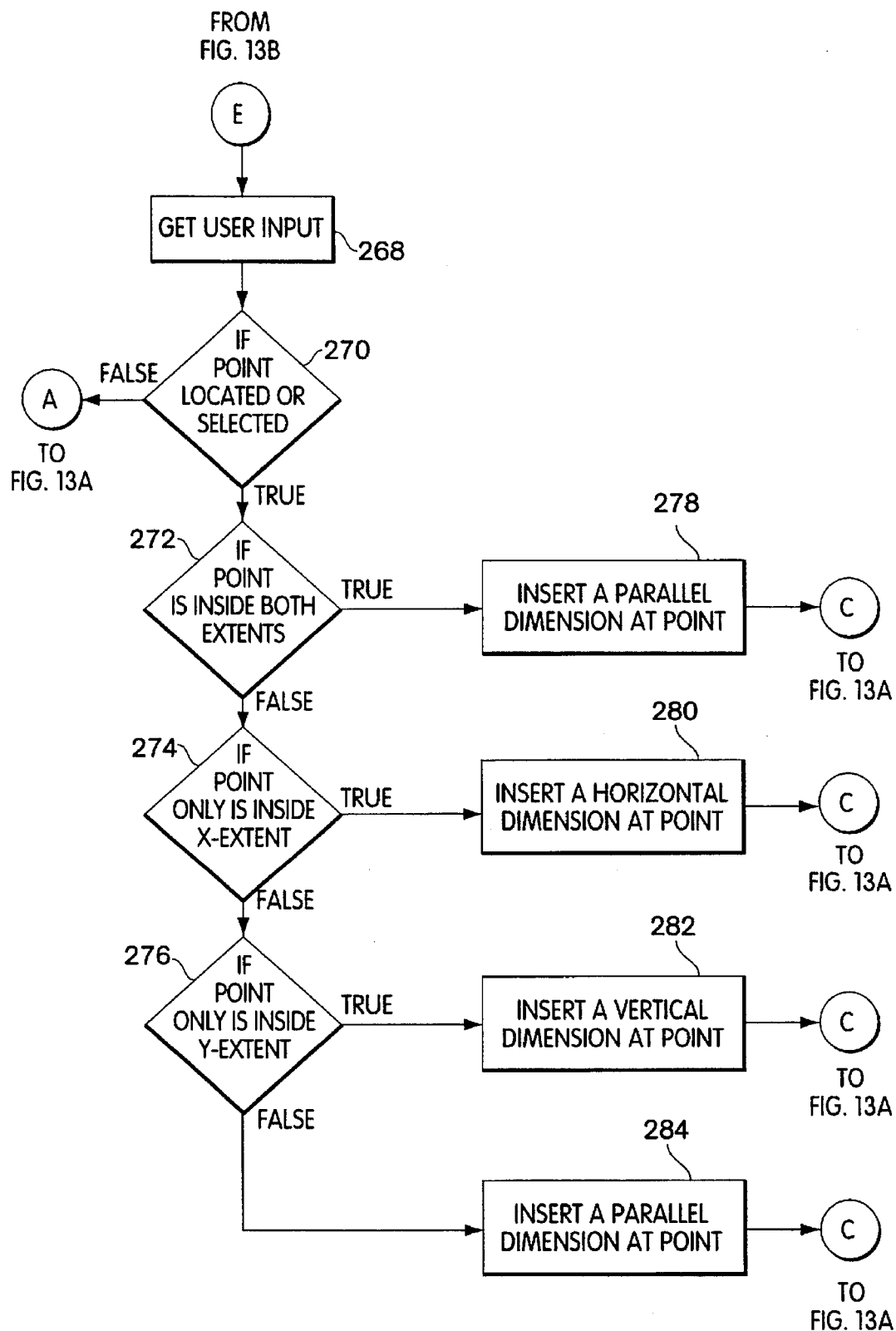
Figure 13D:
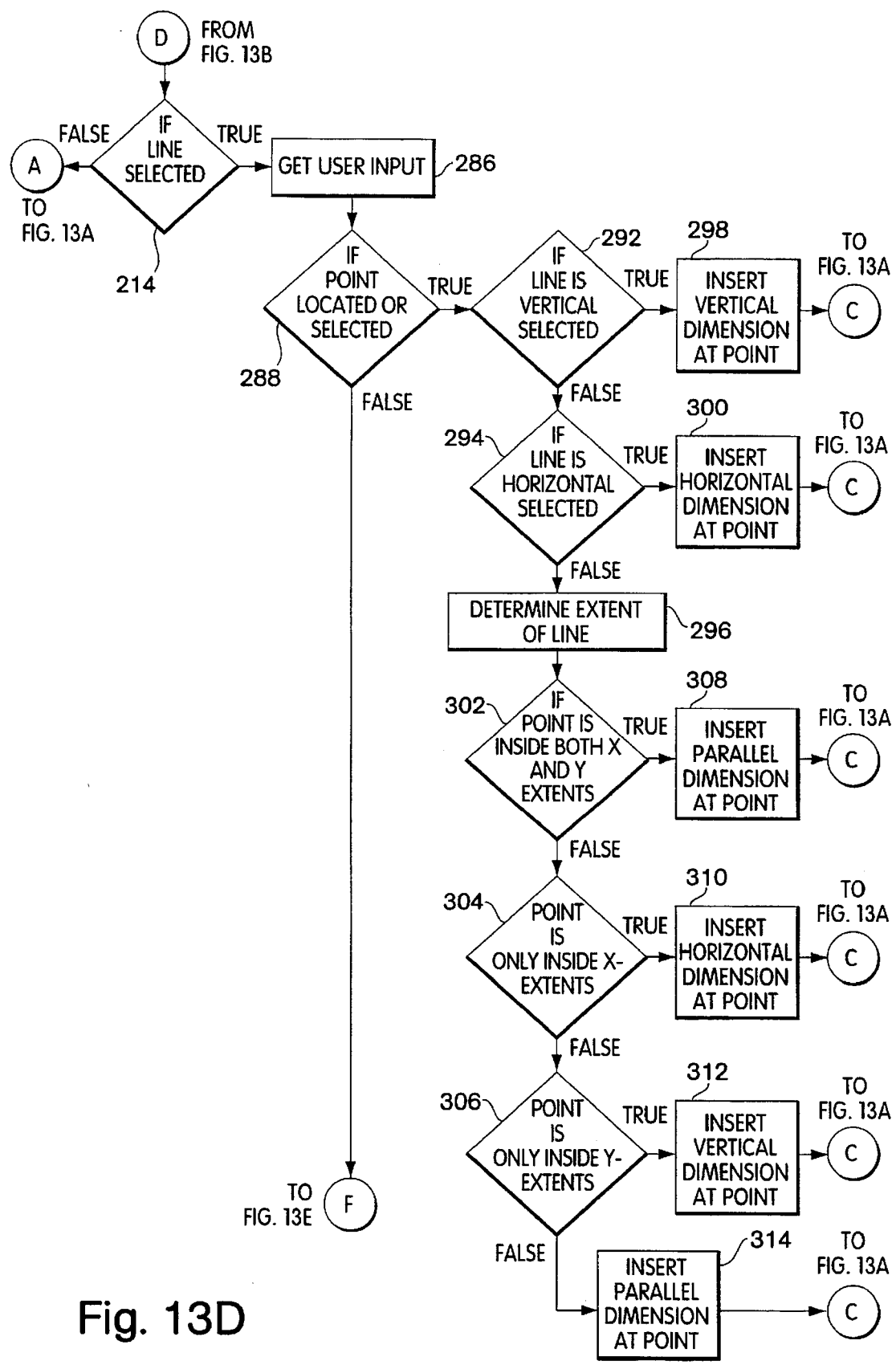
Figure 13E:
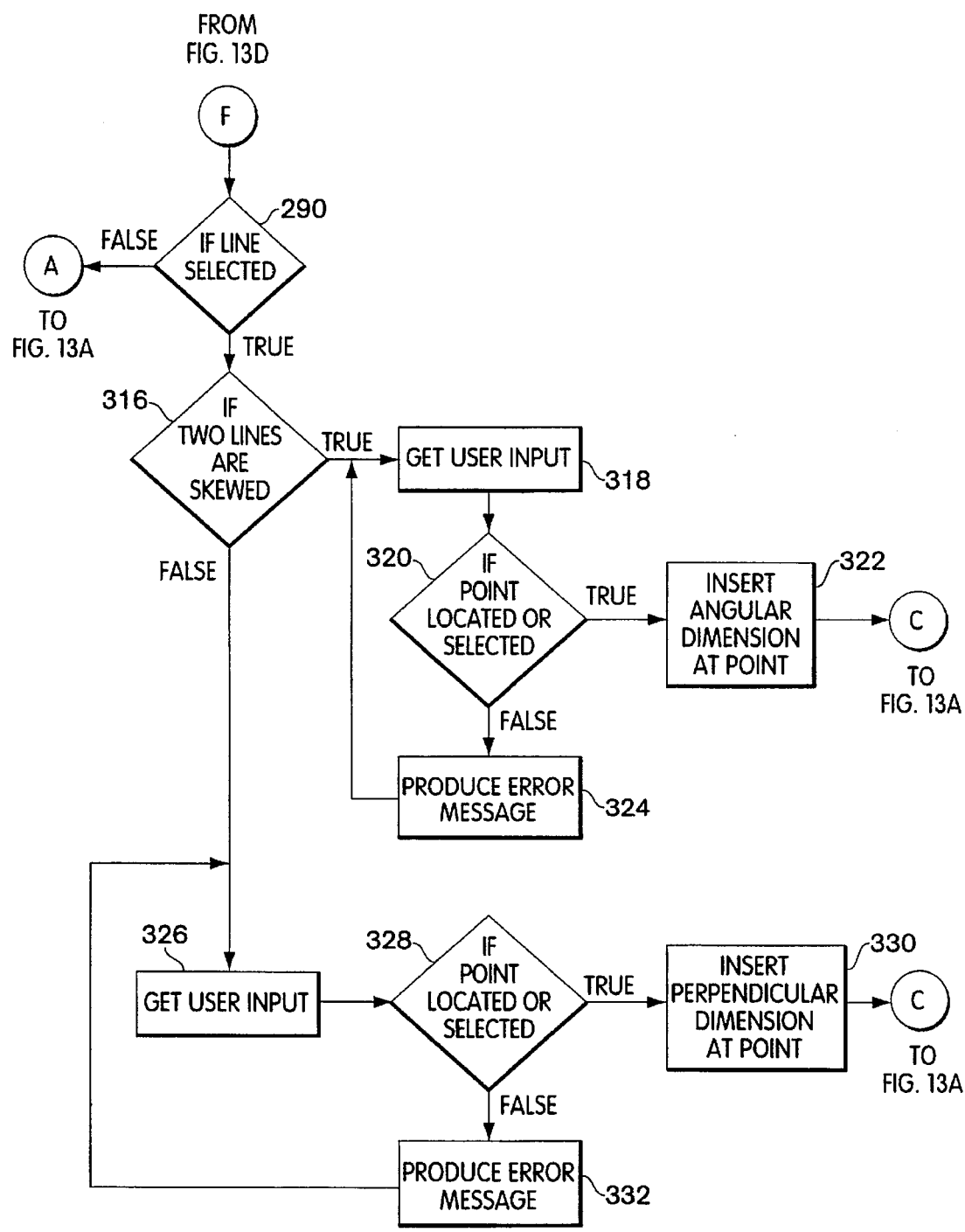

Referring to FIGS. 10A–10E, the quick dimensioning of a skewed line 150 results in the system 10 automatically choosing a length indicator, but the orientation of the length indicator depends upon the placement location indicated by the user. Specifically, the orientation can be vertical (FIG. 10A), horizontal (FIG. 10B), or parallel (FIGS. 10C and 10D). The vertical and horizontal orientations are with respect to an X-Y coordinate grid (FIG. 10E) which typically is unseen by the user, vertical meaning parallel to the Y-axis and horizontal meaning parallel to the X-axis. The parallel orientation is with respect to the skewed line 150. Note that while the skewed line 150 is shown at a 45 degree angle from the X- and Y-axes, it can be at any angle. Also note that the dotted lines and regions are shown for illustration only, they do not appear to the user in the actual display window 48.

As indicated in Table 1, if the user indicates a point within the Y-extent of the skewed line 150 but outside of its X-extent (i.e., a point within the dotted regions 152 and 154 in FIG. 10A) as the placement location, the system 10 will position and display the length indicator vertically (i.e., parallel to the Y-axis), thus providing a measure not of the entire linear length of the skewed line 150 but of its Y-extent or Y-axis component. If, instead, the user indicates a point outside of the Y-extent of the skewed line 150 but within its X-extent (i.e., a point within the dotted regions 156 and 158 in FIG. 10B) as the placement location, the length indicator will be positioned horizontally (i.e., parallel to the X-axis), thus providing a measure not of the entire linear length of the skewed line 150 but of its X-extent or X-axis component. The user also can indicate a point either within both the X- and Y-extents of the skewed line 150 or outside both its X- and Y-extent (i.e., a point within the dotted regions 160, 162, 164, 166, and 168 of FIG. 10C) as the placement location, which placement results in the system 10 displaying the length indicator in a parallel orientation with respect to the skewed line 150 (FIG. 10D). As with horizontal and vertical lines, the graphical portion of the length indicator for skewed lines includes a double-arrowheaded line extending between two endlines, and the text portion includes the numerical value of the line's Y-component length (vertical, FIG. 10A), X-component length (horizontal, FIG. 10B), or linear length (parallel, FIGS. 10C and 10D).

Referring to FIGS. 11A and 11B, when two parallel lines 170 and 172 are selected by the user for quick dimensioning, the system 10 automatically chooses a linear separation indicator 174. After the user selects the first line 170 and the second line 172 (points A and B in FIG. 11A) and then indicates a placement location (point C), the system 10 displays the indicator 174 in the vicinity of the placement location in an orientation which is perpendicular to the two parallel lines 170 and 172. As seen in FIG. 11B, the graphical portion of the separation indicator 174 includes two endlines with arrows indicating the linear separation distance, and the text portion includes the numerical value of the linear separation distance. Note that if the separation distance is great enough, a double-arrowheaded line can extend between the two endlines as shown in other drawings such as FIGS. 9B, 9D, and 10D.

Referring to FIG. 12., if the user selects two skew lines 176 and 178 for quick dimensioning, the system 10 automatically chooses an angular separation indicator 180. After the user selects the first line 176 and the second line 178 (points A and B in example 1 of FIG. 12) and then indicates a placement location (point C), the system 10 displays the indicator 180 in the vicinity of the placement location. In the disclosed embodiment, the angle is measured from the selection point (point A) on the first line 176 to the second line 178 in a counterclockwise direction. Also, the end of the line selected affects the results. If the end of the line closest to the intersection of the two lines is selected, the angular dimension is constructed from an endline that is created on the other side of the intersection point of the lines (e.g., see points A and B in example 2, point A in example 3, and point B in example 4). If, on the other hand, the line further away from the intersection point is selected, an endline is created away from the intersection point (e.g., see points A and B in example 1, point B in example 3, point A in example 4, and points A and B in example 5). The graphical portion of the angular separation indicator 174 includes a double-arrowheaded line extending counterclockwise between two endlines, and the text portion includes the numerical value of the angular separation.

The quick dimensioning of two points is similar to the quick dimensioning of a skewed line as described previously with reference to FIGS. 10A–10E. In general, after the user selects two points, the system 10 creates an unseen line passing through the two points and processing proceeds as if the unseen line were a skewed line. For two points, the system 10 automatically chooses a length indicator for the two points and then, depending on the placement location indicated by the user, the system 10 orients the length indicator vertically, horizontally, or parallel.

Other geometric objects than those listed in Table 1 can be accommodated by the system 10, i.e., can be linked with a particular dimension indicator type such that whenever those geometric objects are selected for quick dimensioning by the user, the system 10 will automatically choose the linked dimension indicator type. In the disclosed embodiment, if the user selects a geometric object not listed in Table 1, a dimension indicator for that object can be entered manually.

The processes which allow the system 10 to perform the functions described previously will now be described with reference to the flowcharts of FIGS. 13A–13E.

Before turning to the flowcharts, however, two terms should be defined. First, the term "select" means to choose a geometric object on the display screen using an input device such as a mouse (e.g., by pressing a first button on the mouse). Second, the term "locate" means to place a point on the display screen or to show a direction, again using an input device such as the mouse (e.g., by pressing a second button on the mouse).

Referring to FIGS. 13A–13E, upon entry into the quick dimensioning function (step 200) in accordance with the invention, the system prompts the user for an appropriate input and then waits until the user provides an input (step 202). The prompts provided to the user include messages such as (i) "Select entity to dimension"; (ii) "Select second line * Locate dimension center * Select entity"; and (iii) "Select second point * Locate point * Select entity". Having previously described (with reference to FIG. 5) what happens when the user selects an existing dimension indicator or an object that already has a dimension indicator related thereto before the user has selected any un-dimensioned geometric objects, the focus now will be on what happens when the user selects an un-dimensioned object. Once the user makes a selection (step 202), the system checks if the user has placed a point on the display screen (step 204) and, if so, an error message is produced (step 216) and the system waits for another input from the user (step 202). If the user has not simply placed a point on the display screen (step 204), a check is made to determine whether the input is a selection of a circle (step 206, FIG. 13A), an arc (step 208, FIG. 13A), a spline (step 210, FIG. 13B), a point (step 212, FIG. 13B), or a line (step 214, FIG. 13D). Each of these selections is described below in a separate paragraph in the order listed above.

If a circle (step 206, FIG. 13A) is selected, the system automatically creates a diameter indicator and then prompts the user to make an appropriate entry (step 218). If the entry by the user is not a point (step 220), an error message is produced (step 222) and displayed to the user on the screen, and the system waits for a valid input from the-User (step 218). If the input is a point (step 220), the diameter indicator is located at that point. The system then loops back and waits for the user to provide the next input (step 202). (Note that, as described previously with reference to FIG. 5, a moving "image" of the appropriate dimension indicator is displayed after the user selects an object and while the user is moving around the display screen trying to decide the point where the indicator should be placed. Once the desired point is reached, the user confirms that location and the image is replaced by the actual dimension indicator. For simplicity and clarity, the movable image will no longer be mentioned, but it should be understood that it is the preferred way of providing feedback to the user as the user determines where to place the dimension indicator on the display screen.)

If an arc (step 208, FIG. 13A) is selected, the system automatically creates a radius indicator and then waits for the user to enter the appropriate input (step 226). If the input from the user is a point (step 228), the radius indicator is located at that point (step 230), and the process loops back to step 202. Otherwise, an error message is produced (step 232), and the system waits for a correct entry from the user (step 226).

If a spline (step 210, FIG. 13B) is selected, the system automatically creates a curved surface length indicator and then prompts the user for an appropriate entry (step 234). If the entry is a point (step 236), the length indicator is displayed at that point, and processing continues to step 202 of FIG. 13A. If the entry is not a point (step 236), an error message appears (step 240), and the process loops back to step 234 of FIG. 13B.

If a point (step 212, FIG. 13B) is selected, a length indicator is created automatically. The system then prompts and waits for an appropriate entry from the user (step 242). An appropriate entry is either the location of a position (step 244) or the selection of a point (step 246). Any other entry returns the user back to step 202 of FIG. 13A. If the entry is the location of a position (step 244), it is determined if the horizontal distance between the point and the located position is greater than a predetermined value (step 248) and, if so, the user is prompted to locate or select a point where a horizontal length indicator should be displayed (steps 250–256), and then the processing continues to step 202 of FIG. 13A. If the horizontal distance between the point and the located position is less than a predetermined value (step 248), the user is prompted to locate or select a point where a vertical length indicator should be displayed (steps 258–264), and then the processing continues to step 202 of FIG. 13A. If the user's entry is the selection of a point (step 246) instead of the location of a position (step 244), the X and Y bounding extents of an imaginary line beginning at one point and ending at the other point are determined (step 266). The user is then prompted to locate or select a point where an appropriate length indicator should be displayed (steps 268 and 270, FIG. 13C). Depending on the point entered by the user (steps 272, 274, and 276), the length indicator will be (i) oriented parallel to the imaginary line and located at the entered point, (ii) positioned horizontal, or (iii) positioned vertical (steps 278–284). (This process also is described previously with reference to FIGS. 10A–10E.)

If a line (step 214, FIG. 13D) is selected, the system automatically creates a length indicator (oriented vertically, horizontally, or parallel), a linear separation distance indicator, or an angular separation distance indicator. The user is then prompted to either (i) locate or select a point (steps 286 and 288) or (ii) select a line (steps 286 and 290, FIG. 13E). If the user locates or selects a point (step 288, FIG. 13D), it is determined whether the line is oriented vertically or horizontally (steps 292 and 294). If vertically oriented (step 292), a vertical length indicator is displayed at the point (step 298). If horizontally oriented, a horizontal length indicator is displayed at the point (step 300). If the orientation of the line is neither vertical nor horizontal, the X and Y extents of the line are determined (step 296), and depending on where the point is placed (steps 302–306), a parallel length indicator, a horizontal length indicator, or a vertical length indicator is displayed at that point (steps 308–314). (The process of steps 296–314 also are described previously with reference to FIGS. 10A–10E.) If the user selects a second line (step 290, FIG. 13E) instead of locating or selecting a point (step 288, FIG. 13D), it is determined if the two lines are skewed with respect to each other (step 316). If they are skewed, the user is prompted to locate or select a point, which point will be the location of an angular separation distance indicator (steps 318–324). If the two lines are not skewed (i.e., if the two lines are parallel), the user is prompted to locate or select a point, which point will be the location of a linear separation distance indicator oriented perpendicular to the two parallel lines (steps 326–332).

The quick dimensioning feature according to the invention which is described herein can be implemented by one or more computer programs which provide instructions to a general purpose, programmable computer. In the disclosed embodiment, the system 10 of FIG. 1 achieves the functionality described herein by executing the computer program (s). Other embodiments can include a design and drafting system in which specially-designed, dedicated, hard-wired electronic circuits perform all functions described herein without the needed for instructions from computer programs.

If the quick dimensioning feature is implemented by one or more computer programs, the programs, once loaded into the system 10 (FIG. 1) and executing, typically utilize the main internal memory 14 to store (as one example) input from the user and to store (as another example) a list or lists which identify the geometric objects supported by the quick dimensioning feature and the corresponding dimension indicator types (e.g., see Table 1). The executing programs also can utilize the storage devices (e.g., the hard and floppy disks 32 and 34) to store data and files during the execution of the quick dimensioning feature.

Other modifications and implementations will occur to those skilled in the art without departing from the spirit and the scope of the invention as claimed. Accordingly, the invention is to be defined not by the preceding illustrative description, but by the following claims.

What is claimed is:

1. A method for automatically choosing and then displaying a dimension indicator type for indicating the size of a geometric object for a user of a computer-aided design and drafting system, comprising the following steps which are performed automatically by the computer-aided design and drafting system:

(a) identifying one of a plurality of possible geometries as the geometry of a displayed geometric object;

(b) choosing one of a plurality of possible dimension indicator types for the object based on the identification in step (a);

(c) displaying an image of the chosen dimension indicator until a placement location is selected for the chosen dimension indicator; and (d) displaying the chosen dimension indicator type in the vicinity of the placement location.

2. The method of claim 1 wherein the plurality of possible geometries includes a circle, an arc, a line, and a spline.

3. The method of claim 2 wherein the plurality of possible dimension indicator types includes a diameter indicator, a radius indicator, and a length indicator.

4. The method of claim 1 wherein the plurality of possible dimension indicator types includes a diameter indicator, a radius indicator, and a length indicator.

5. A method for automatically choosing and then displaying a dimension indicator type for indicating a spatial relationship between two geometric objects for a user of a computer-aided design and drafting system, comprising the following steps which are performed automatically by the computer-aided design and drafting system:

(a) identifying one of a plurality of possible geometries as the geometry of a first displayed geometric object;

(b) identifying the geometry of a second displayed geometric object;

(c) choosing one of a plurality of possible dimension indicator types for the first and second objects based on the identifications in steps (a) and (b);

(d) displaying an image of the chosen dimension indicator until a placement location is selected for the chosen dimension indicator; and (e) displaying the chosen dimension indicator type in the vicinity of the placement location.

6. The method of claim 5 wherein the plurality of possible geometries includes a line and a point.

7. The method of claim 6 wherein the plurality of possible dimension indicator types includes a linear separation distance indicator and an angular separation indicator.

8. The method of claim 5 wherein the plurality of possible dimension indicator types includes a linear separation distance indicator and an angular separation indicator.

* * * * *